July 6, 1937.  W. C. BUCKNAM ET AL  2,085,896
METHOD OF WELDING
Original Filed April 6, 1929   2 Sheets-Sheet 1
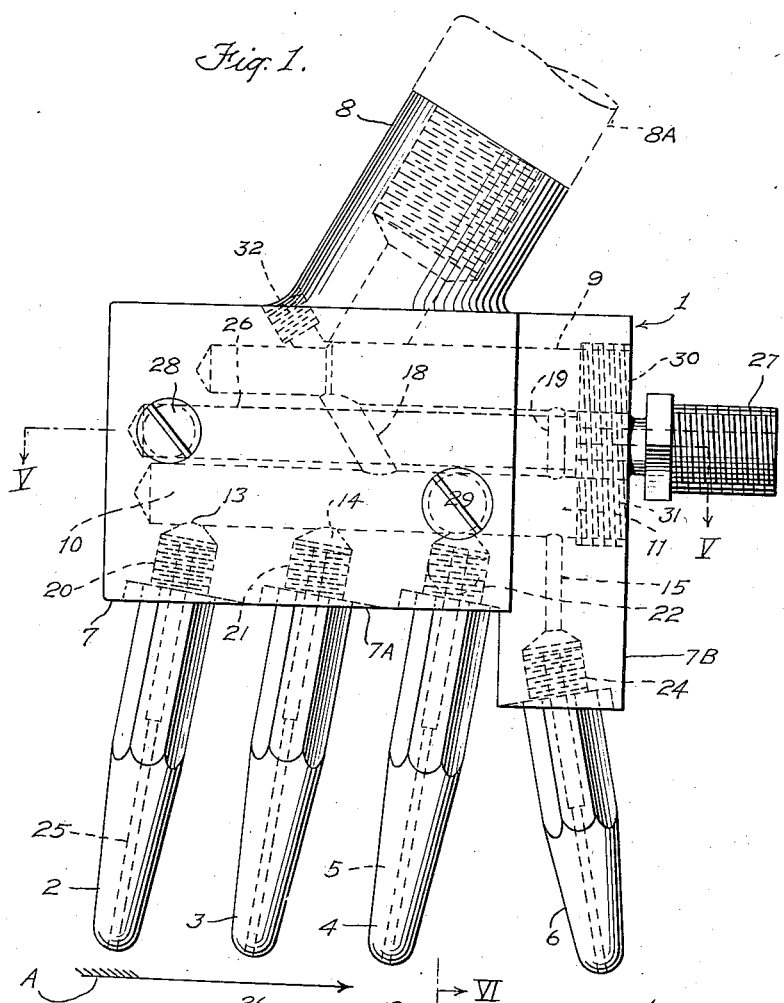
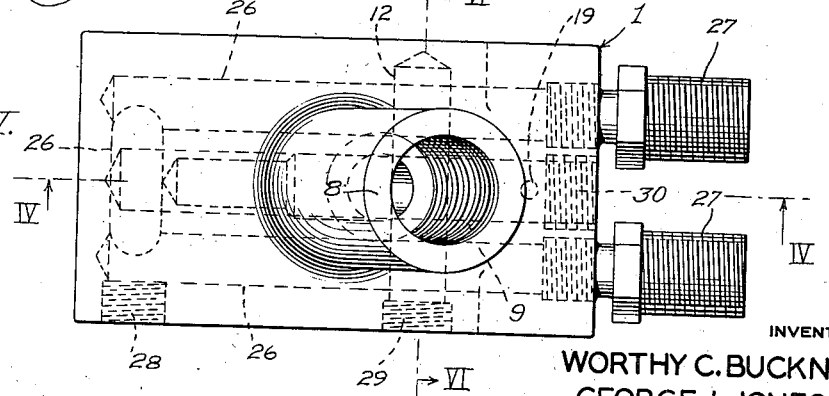
INVENTORS:
WORTHY C. BUCKNAM
GEORGE I. JONES
ATTORNEY July 6, 1937.  W. C. BUCKNAM ET AL  2,085,896
METHOD OF WELDING
Original Filed April 6, 1929  2 Sheets-Sheet 2
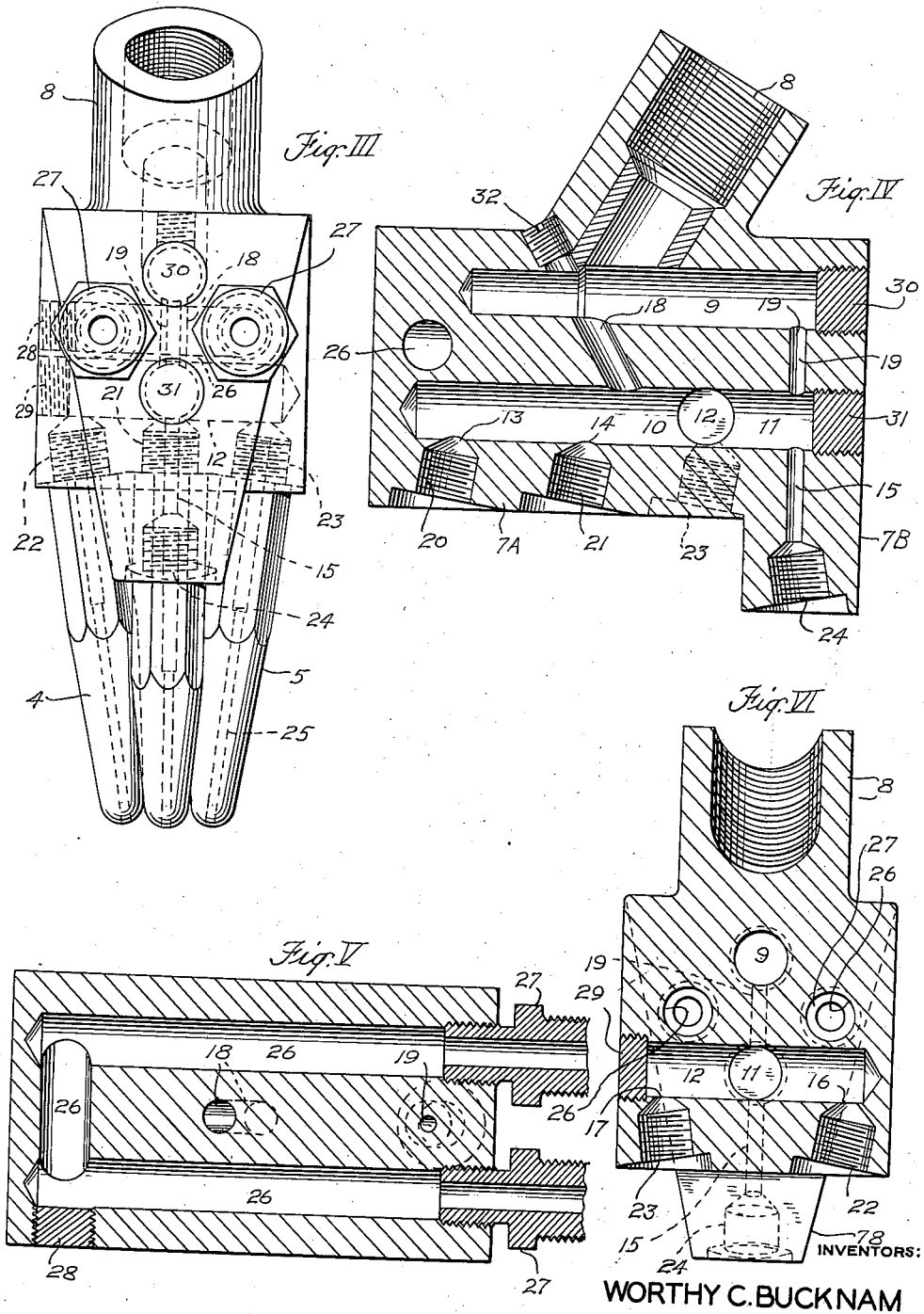
INVENTORS:
WORTHY C. BUCKNAM
GEORGE I. JONES
BY
ATTORNEY Patented July 6, 1937

2,085,896

UNITED STATES PATENT OFFICE 2,085,896

METHOD OF WELDING

Worthy C. Bucknam, Mechanic Falls, Maine, and George I. Jones, Buffalo, N. Y., assignors, by mesne assignments, to Union Carbide and Carbon Corporation, a corporation of New York Original application April 6, 1929, Serial No. 353,129. Patent No. 1,947,755, dated February 20, 1934. Divided and this application June 28, 1933, Serial No. 677,994

10 Claims. (Cl. 113—112)

Our invention relates to a method of welding in which a flame is directed upon the puddle of weld metal at an inclination to the surface being welded and in the direction of the completed weld or rearwardly in respect to the progress of the weld.

An object of our invention is to efficiently fuse the edges of the seam to be welded and to effectively puddle the fused metal without blowing it out of the seam or burning it. Another object of our invention is to reinforce the weld by blowing the fused puddle away from the direction of progress of the weld and above the surface of the metal being welded.

Our invention has special utility for welding longitudinal seams in tubes or plates by fusing the adjacent edges to be united and thereby causing the metal to flow together and unite. The method can be conveniently performed with the use of a welding nozzle having a plurality of orifices supplied with a combustible gas such as oxygen and acetylene. The nozzle and the seam have a relative movement with respect to each other so that the flames formed by the combustible gas issuing from the orifices traverse the seam in a lengthwise direction. Preferably the seam is progressively subjected to one or more preheating flames inclined in the direction of the movement of the flames with respect to the work and the seam is immediately subsequently subjected to one or more flames inclined in the opposite direction to the movement of the flames with respect to the seam to fuse the edges of the seam into a puddle and complete the welding operation.

The above and other objects of our invention may be carried out by one or more forms of apparatus. For the purpose of illustrating our invention, it will be described in connection with the suitable form of apparatus disclosed in the accompanying drawings, in which:

Figs. I, II, and III are respectively a side view, a plan view, and a rear end view of a torch nozzle; and Figs. IV, V and VI are sectional views on line IV—IV in Fig. II; line V—V in Fig. I; and line VI—VI in Fig. II, respectively.

Referring to the drawings, the torch head or nozzle comprises a nozzle block 1 of brass or the like, having gas conducting and cooling fluid passages formed therein. A set of preheating nozzle tips 2, 3, 4 and 5, and a welding nozzle tip 6, project from the bottom 7 of the nozzle block.

The tips are detachably coupled to the block and have gas passages communicating with the gas distributing passages therein. The preheating tips are attached to the upper step 7—A and the welding tip is attached to the lower and downwardly extending step 7—B formed in the bottom face of the block. The downwardly extending step 7—B makes it possible to place the lower end of the welding tip closer to the adjacent preheating tips for a given angle of inclination of the welding tip included between the rearwardly inclined welding tip and the bottom face of the nozzle block.

The top of the nozzle block 1 has a screw threaded gas inlet 8, adapted to be connected to a mixing chamber 8—A which supplies a combustible mixture of acetylene and oxygen or a like combustible gaseous mixture to the block. The inlet 8 communicates with a longitudinal receiving chamber 9 formed in the block.

The receiving chamber communicates with a distributing chamber 10 underneath it. The distributing chamber consists of a branch 11, parallel to the receiving chamber and a second branch 12, in communication with the first branch. The axis of the second branch is perpendicular to the axis of the first branch and in the same horizontal plane.

The first branch 11 is provided with outlets 13 and 14, for supplying gas to the two forward preheating tips, and another outlet 15 for supplying gas to the welding tip. The opposite ends of the second branch 12 communicate with outlets 16 and 17, for supplying gas to the preheating tips, 4 and 5, which are arranged at opposite sides of a vertical plane passing through the preheating tips 2, 3 and welding tip 6.

The receiving and distributing chambers are connected by a passage 18, which directs the gas into the distributing chamber against a wall thereof intermediate the outlet 14 and the branch 12. The chambers 9 and 10 are connected by another passage 19, which directs the gas into the distributing chamber at a point directly opposite the outlet 15, for supplying gas to the welding tip. The sum of the areas of passages 18 and 19 is made equal to or slightly greater than the sum of the areas of the gas passages in the nozzle tips in order to maintain a pressure within the chamber 10 sufficient to maintain the desired operating pressure and gas velocity within the nozzle tip passages.

For convenience the direction in which the arrow A in Fig. 1 points will be designated as a rearwardly direction and the arrow will also designate the relative movement of the work in respect to the torch, the shaft of the arrow being used to designate the surface of the work moving in the direction in which the arrow points. Forwardly inclined threaded sockets 20, 21, 22 and 23 are formed in the bottom of the nozzle block below the respective outlets 13, 14, 16 and 17 to receive threaded rear ends of the preheating nozzle tips. A rearwardly inclined threaded socket 24 is formed below the outlet 15 to receive the welding tip. Each tip has a passage 25 therethrough which communicates with its respective outlet.

In this construction the preheating tips are forwardly inclined. The angle of inclination of these tips to the normal to the face of the block or the surface of the work is preferably about 10°. The two forward tips 2 and 3 are in line in reference to the line of movement of the work relative to the torch nozzle. The two intermediate tips 4 and 5 are located one on each side of the line of the first two tips. The welding tip 6 is inclined in a rearwardly direction and preferably at an angle of about 10° to the normal to the face of the block or the surface of the work. This tip is in line with the two forward preheating tips.

A means is provided for cooling the torch nozzle to prevent it from becoming over-heated and to prevent a flash back from the gas due to the heat. Referring to Figs. I, II, and V, a U shaped cooling fluid passage 26, is shown formed in the block 1. The two long branches of the U extend parallel to the gas receiving and distributing chambers and in a plane intermediate these chambers. Each branch of the U is provided with a hose connection 27, one to supply the cooling fluid, and the other to discharge it. The several tips are made of copper or the like and, because of their mechanical connection to the block 1, considerable heat is withdrawn from the tips by the water or other cooling medium that circulates through the block.

The chambers and passages may be formed in the nozzle block in any convenient manner. As shown in the accompanying drawings they are drilled and the open ends of the holes are closed where necessary by plugs 28, 29, 30, 31 and 32.

In the operation of the torch nozzle, a mixture of combustible gas is supplied from the mixing chamber 8—A to the inlet 8, which delivers it to the receiving chamber. The gas splits into two streams in the receiving chamber. One of the streams passes through the passage 18, and impinges against the bottom wall of the distributing chamber. The other stream passes through the passage 19 and is directed towards the outlet leading to the welding tip. In the distributing chamber the gas is broken up into as many streams as there are tips, a stream going to each tip.

Although our improved torch nozzle is especially useful on automatic welding machines which weld the longitudinal seams of tubular articles such as barrels, tanks and the like, it is also well adapted for use in weld uniting plates and similar work. It is generally preferable to mount the torch nozzle in a fixed position on the welding machine and feed the work so that the joint to be welded travels lengthwise under the nozzle along the main longitudinal plane of the preheating and welding flames. In some instances, however, the torch and improved nozzle may be propelled along the seam of stationary work to weld such seams.

For convenience in explaining the operation of our improved nozzles, it will be assumed that the latter are stationary and the work seam is fed in the direction and along the line indicated by the arrow A in Fig. I.

The streams of gas issuing from the tips when ignited project flames upon the metal passing the ends of the tips. The seam to be welded is aligned with the bores 25 in the aligned tips 2, 3 and 6, and these tips direct a flame onto the seam, while the other two tips 4 and 5 direct a flame onto the metal surfaces adjacent each side of the seam. Considering one point on the seam of the metal as it advances under the tips, the flames from the preheating tips are successively directed upon this point in an inclined forwardly direction and the temperature of the metal is gradually increased thereby until the temperature has been brought substantially up to the fusion point of the metal when the point on the metal has passed the rearmost of the preheating tips. The flame from the welding tip is next directed upon this point in an inclined rearwardly direction. The metal is heated to or beyond the temperature of fusion, and the edges of the metal are fused together.

The force of the rearwardly inclined welding flame pushes the fused metal to the rear of the welding tip where it may begin to cool instead of being pushed ahead of the tip and closer to the heating zone of the preheating tips and thus increase the tendency to burn the metal and blow it from the seam as is done in prior types of torch nozzles. The rearwardly impinging flame produces an improved puddling of the fused metal and an improved weld is obtained.

A positive circulation of a cooling fluid in the passage 26 adjacent to the gas passages, keeps the torch nozzle cool, prevents flash backs, and generally increases the efficiency of the nozzle.

While we have described our invention in connection with a certain type of apparatus, it will be understood that the degree of the inclination of the flames and other variations of our method may be made without departing from the scope of our invention as defined in the appended claims, it being essential however that the last flame directed upon the molten puddle be inclined rearwardly in respect to the progress of the weld.

This application is a division of our copending application, Serial No. 353,129, filed April 6, 1929, which issued February 20, 1934 as Patent No. 1,947,755.

We claim:

1. The method of welding comprising heating the metal of the seam to be welded and directing a flame upon the puddle of weld metal at an inclination to the surface of the work and in the direction of the completed weld in order to impel the puddle of weld metal away from the direction of progress of the weld.

2. The method of welding comprising progressively preheating the seam to be welded by progressively advancing a preheating flame along the seam; and simultaneously advancing a rearwardly inclined welding flame directed on the preheated surface, said inclination being in respect to the surface of the work being welded and in respect to the direction of the progress of the weld, said rearwardly inclined welding flame serving to impel molten metal away from the direction of progress of the weld.

3. The method of welding comprising directing a forwardly inclined preheating flame on the seam to be welded; and subsequently directing a rearwardly inclined welding flame on the same portion of the seam to be welded, said inclination being in respect to the surface of the work being welded and in respect to the direction of the progress of the weld, said rearwardly inclined welding flame serving to impel molten metal away from the direction of progress of the weld.

4. The method of welding comprising progressively preheating the seam to be welded by progressively advancing a forwardly inclined preheating flame along the seam; and simultaneously advancing a rearwardly inclined welding flame along the preheated surface, said inclination being in respect to the surface of the work being welded and in respect to the direction of the progress of the weld, said rearwardly inclined welding flame serving to impel molten metal away from the direction of progress of the weld.

5. The method of welding a flat metal member, said method comprising heating the metal of the seam to be welded, and directing a flame upon the puddle of weld metal at an inclination to the surface of the work and in the direction of the completed weld.

6. The method of welding comprising directing a forwardly inclined preheating flame on the seam to be welded and subsequently directing a rearwardly inclined welding flame on the same portion of the seam to be welded, said preheating flame and said welding flame being moved together and being divergent from each other, and said inclination of each flame being in respect to the surface of the work being welded and in respect to the direction of the progress of the weld.

7. The method of welding a horizontal metallic seam which comprises the steps of heating the metal of the seam substantially to the fusion temperature by directing forwardly inclined flames upon said seam, and completing such welding by further heating and propelling such metal away from the influence of said forwardly inclined flames by a rearwardly inclined flame whereby said seam is fused rearwardly of said rearwardly inclined flame.

8. A method of welding a seam in metal which comprises preheating successive portions along said seam, and applying a rearwardly inclined high-temperature flame to such preheated portions.

9. A method of welding a seam in metal work which comprises preheating successive unwelded portions of the work along said seam by applying a preheating flame to such portions, and then applying a rearwardly inclined welding flame to such preheated portions.

10. A method of welding a seam between metal members which comprises preheating successive unwelded portions of said members along said seam by applying a forwardly inclined preheating flame to such portions during relative movement of said flame and said members lengthwise of said seam, and applying a rearwardly inclined welding flame to such preheated portions during such relative movement.

WORTHY C. BUCKNAM.
GEORGE I. JONES.